Nov. 6, 1928.
L. D. SOUBIER
1,690,998
APPARATUS FOR SUPPLYING MOLTEN GLASS TO MOLDS
Filed March 16, 1927     3 Sheets-Sheet 1
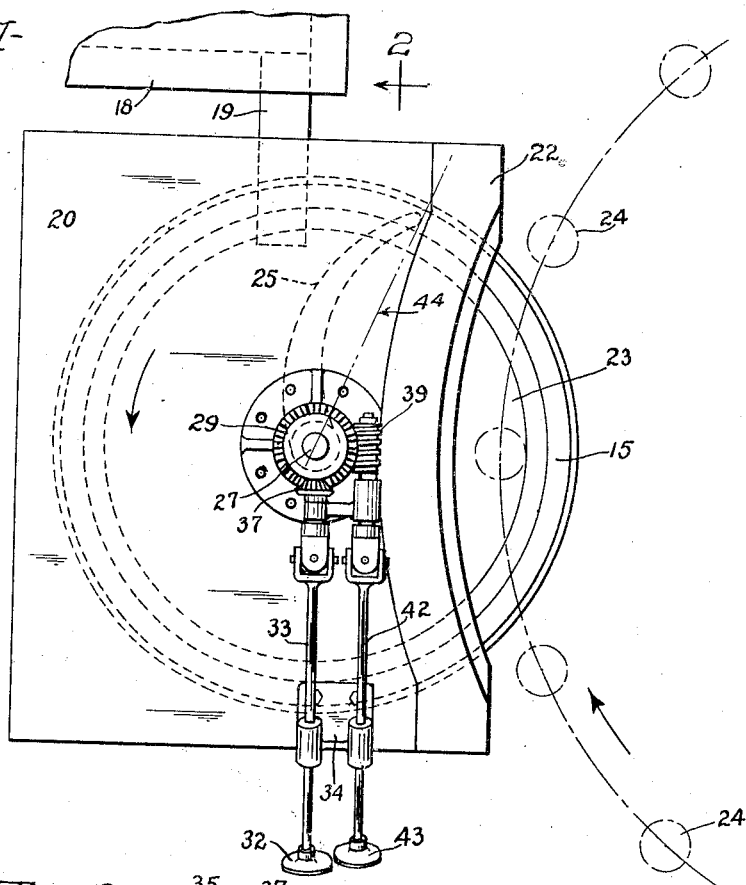
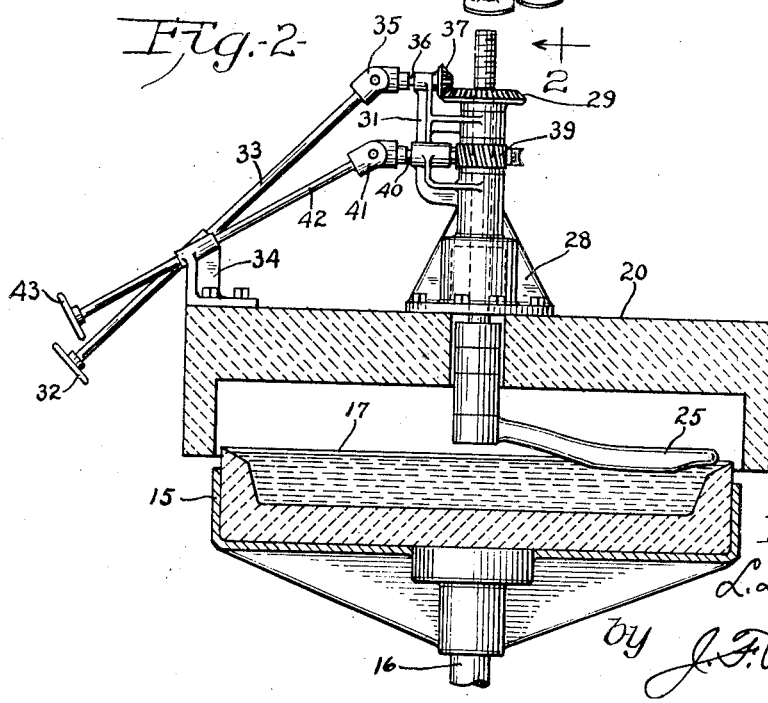
Inventor:
L. D. Soubier
by J. F. Rule Atty.

Nov. 6, 1928.
L. D. SOUBIER
1,690,998
APPARATUS FOR SUPPLYING MOLTEN GLASS TO MOLDS
Filed March 16, 1927   3 Sheets-Sheet 2
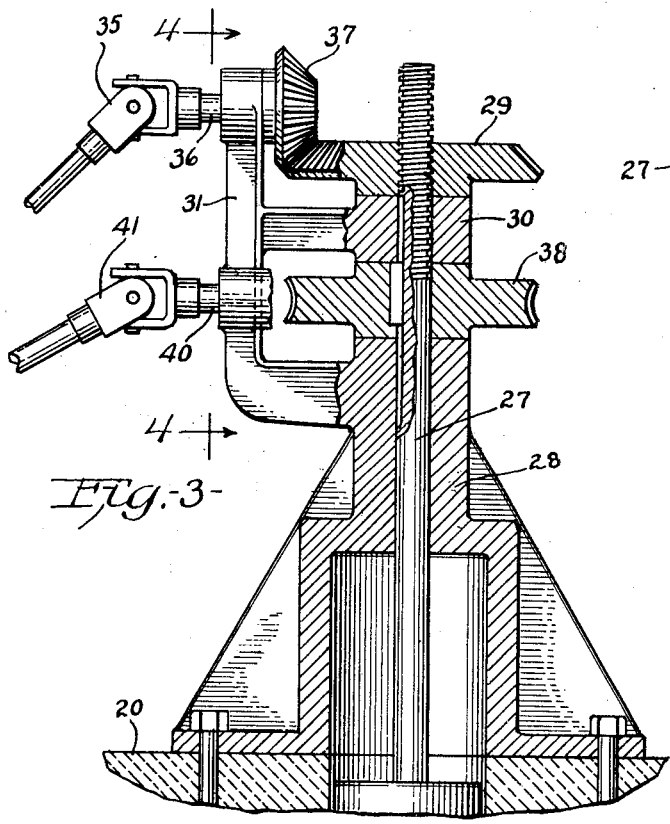
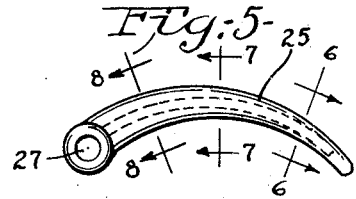
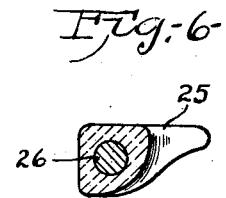
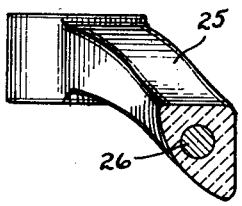
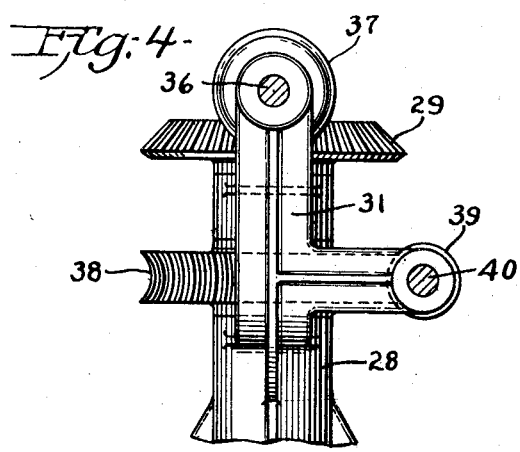
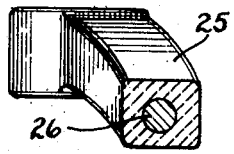
Leonard D. Soubier
Inventor:
by J. F. Rule,
Atty.

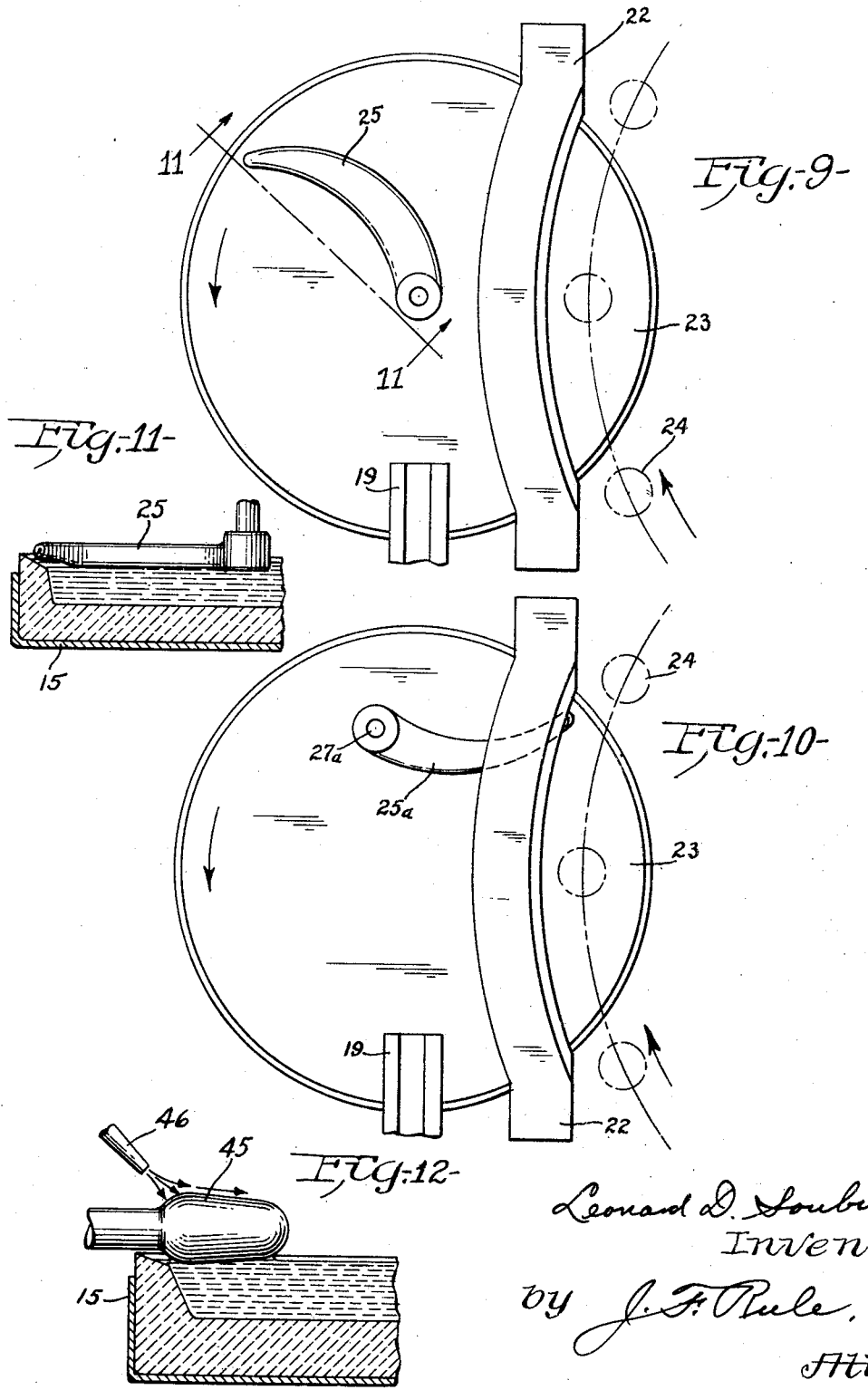

Patented Nov. 6, 1928.

1,690,998

UNITED STATES PATENT OFFICE.

LEONARD D. SOUBIER, OF TOLEDO, OHIO, ASSIGNOR TO THE OWENS BOTTLE COMPANY, OF TOLEDO, OHIO, A CORPORATION OF OHIO.

APPARATUS FOR SUPPLYING MOLTEN GLASS TO MOLDS.

Application filed March 16, 1927. Serial No. 175,709.

My invention relates to means for supplying molten glass to a gathering point or area at which mold charges of glass are gathered as by means of molds dipping into the glass and gathering by suction. The invention as herein disclosed is embodied in an apparatus comprising a continuously rotating pot or tank to which the glass is supplied from the main furnace, such apparatus being commonly used with the Owens type of suction gathering machines for blowing glass articles. Each mold as it contacts with the glass in the revolving pot, chills the surface of the glass to a certain extent. Also, the string or tail of glass which is severed at the bottom of the mold when the latter is lifted after gathering its charge, drops back into the pot, this tail of glass being more or less chilled through exposure to the air and contact with the cutter and mold. These chilled portions of glass falling back into the main body of glass also have a tendency to trap air and introduce bubbles into the glass. The air bubbles and chilled portions of glass may later be drawn into succeeding molds, thereby producing defects in the finished ware. The rotation of the pot carries the chilled portions of glass away from the gathering area so that they may be reheated and reassimilated to a certain extent before again reaching the gathering area. Under some conditions of operation, however, particularly with modern machines presenting the molds for gathering at very short intervals, and, more especially, machines of the multiple mold type in which a plurality of charges are gathering simultaneously into plural molds, the rotation of the gathering pot does not of itself permit the chilled portions of air glass to be completely reheated and the air bubbles dissipated before being again brought to the gathering point.

An object of the present invention is to provide means for overcoming this difficulty and for this purpose there is provided means by which the chilled portions of glass as they pass beyond the gathering area, are forced beneath the surface or deflected away from the path of movement of the glass which is being carried to the gathering area, thus permitting the chilled portions to be entirely reheated before again reaching the gathering point, whereby a fresh supply of glass of the proper temperature and free from air bubbles or blisters is always presented to the molds when the latter are brought to the gathering point.

Other objects of the invention will appear hereinafter.

In the accompanying drawings:

Figure 1 is a plan view of an apparatus embodying the present invention, the molds and their path of movement being indicated diagrammatically.

Figure 2 is a sectional elevation at the line 2—2 on Figure 1.

Figure 3 is a sectional elevation on an enlarged scale, of the adjusting mechanism mounted on the hood of the revolving pot.

Figure 4 is a sectional elevation at the line 4—4 on Figure 3.

Figure 5 is a plan view of the deflecting arm.

Figures 6, 7 and 8 are sectional detail views taken at the lines 6—6, 7—7 and 8—8, respectively, on Figure 5.

Figure 9 is a partly diagrammatic plan view showing the rotating pot and deflecting arm, the arm being curved in the opposite direction from that shown in Figure 1.

Figure 10 is a similar view showing a modified arrangement of the deflecting arm.

Figure 11 is a fragmentary sectional view at the line 11—11 on Figure 9.

Figure 12 is a detail view of a modification.

The present application discloses certain features of invention also disclosed in the copending application of Meyer M. Eppstein, Serial Number 131,183, filed August 24, 1926.

Referring to the accompanying drawings, a pot or tank 15 mounted on a central shaft 16 (Fig. 2) is rotated continuously about its central vertical axis. Molten glass 17 may be supplied in a continuous stream from a main melting or refining tank 18 through a spout 19 to the revolving pot. A stationary hood 20 covers the major portion of the revolving pot and is formed with a jack arch or wall 22 which exposes a gathering area 23. Burners (not shown) may be provided as usual to supply heat to the glass in the pot. Molds 24 carried on the continuously rotating mold carriage of a glass blowing machine are brought in succession over the gathering area 23, dip into the glass and gather charges of glass by suction. As each mold lifts from the glass in the pot, a knife shears across the bottom of the mold, thereby severing the tail of glass extending from the supply body to the mold and permitting it to drop back into the rotating pot.

In order to insure that the chilled portions of glass produced by the gathering operations shall be completely reheated and reassimilated before again being brought to the gathering area, there is provided a stationary deflecting arm 25 which serves either to force the chilled portions of glass beneath the surface or deflects the chilled glass laterally from a direct circular path of movement, thus preventing it from being again carried to the gathering area before it has been completely reheated and reduced to the same homogeneous condition and temperature as the body of glass at the gathering point.

The arm 25 comprises a body of refractory material molded on a central metal core 26 extending laterally from a central vertical shaft 27. The shaft extends upward through a standard 28 mounted on the hood 20. The upper portion of the shaft is screw threaded to receive a correspondingly threaded gear 29 which rests on a bearing 30. This bearing is formed on a bracket 31 formed integrally with the standard 28. The gear 29 is rotatable for the purpose of adjusting the shaft 27 vertically and thereby adjusting the arm 25 up or down. This vertical adjustment is effected by means of a hand wheel 32 carried on a rod 33 mounted in a bracket 34, said rod having a universal joint connection 35 with a shaft 36 mounted in the bracket 31 and carrying a bevel pinion 37 in mesh with the gear 29. The arm 25 is also rotatively adjustable about the axis of the shaft 27 to any desired position. For this purpose, a worm gear 38 is splined on the shaft 27 and may be rotated by means of a worm 39 on a shaft 40 having a universal connection 41 with a rod 42 carrying a hand wheel 43, said rod journalled in the bracket 34.

As indicated by the arrows in Figure 1, the mold carriage is rotating in a clockwise direction and the pot 15 in a counter-clockwise direction, so that the glass in the pot is moving in substantially the same direction through the gathering zone as the mold. The arm 25, as indicated in Figures 1 and 2, is positioned in advance of the gathering point, with its lower edge beneath the surface of the glass. The arm extends in an approximately radial direction across the glass but is bowed or curved so that its central portion is beyond or in advance of a radial line 44 connecting the ends of said arm. There is thus presented a sort of pocket in which the advancing glass is trapped and thereby forced beneath said arm. In this manner, the chilled surface portions are forced beneath the surface so that they will be properly reheated and reassimilated into the main body of glass before they are again brought to the gathering point.

As shown in Figure 9, the arm 25 is bowed or curved in the opposite direction from that shown in Figure 1. The arm thus extends in a direction so inclined to the direction of movement of the glass that it tends to deflect the glass radially outward, so that it is not carried directly to the gathering point by the rotation of the tank. The arm 25 at the same time is more or less effective to force the glass beneath the surface.

Figure 10 shows an arm 25$^a$ mounted on a shaft 27$^a$ located eccentrically of the revolving pot. This arm is so positioned and arranged that it tends to deflect the glass inwardly toward the center of the pot. This arm may be both rotatively and vertically adjustable in the same manner as the arm 25.

Figure 12 shows a modification in which a roller 45 is provided. This roller rotates about a stationary axis and may either be positively rotated by any suitable mechanism (not shown) or may be rotated by the glass in the rotating pot. By providing mechanism independent of the glass for rotating the roll, the latter may be driven at a higher surface speed than that of the glass. A burner 46 may be provided to direct a flame against the roll and thereby keep it heated to a temperature sufficiently high to prevent an excessive accumulation of glass on the roll. The heat supplied by the burner 46 also assists in remelting the chilled surface portions of glass which are immersed by the action of the roll.

Various modifications other than those herein disclosed may be resorted to within the spirit and scope of my invention.

What I claim is:

1. The combination of means for supplying a body of molten glass, means to cause movement of the glass past a gathering point in a path by which the glass is again returned to the gathering point, and means for forcing beneath the surface of the glass for reheating and reassimilation, portions thereof which have been chilled at the gathering point.

2. The combination of means for causing a movement of a body of molten glass past a gathering area, and means for forcing chilled portions of the glass beneath the surface for reheating.

3. The combination of means for causing a movement of a body of molten glass past a gathering area, and an implement extending into the glass at a point beyond the gathering area and arranged to force a portion of the surface glass downward beneath the surface of the surrounding glass.

4. The combination of means for causing a movement of a body of molten glass past a gathering area, and an arm in the path of movement of the glass beyond the gathering point and extending transversely of the moving glass, said arm protruding downward beneath the surface of the glass and arranged to deflect the surface portion of the glass downward into the body of glass.

5. The combination of a container for a supply body of molten glass presenting a gathering area, and means for forcing beneath the surface of the glass, portions thereof which have become chilled at the gathering area.

6. The combination of a container for a supply body of molten glass presenting a gathering area, an implement located over the glass in the container and extending radially thereof, said implement being partly immersed and maintained continuously at a substantially constant depth in the glass, and means for effecting a continuous relative rotation of said implement and container.

7. The combination of a tank to contain molten glass, a stationary refractory member extending radially of the tank and dipping into the glass, and means for rotating the tank.

8. The combination of a tank rotatable about a vertical axis, means to supply molten glass to the tank, and a stationary refractory arm extending radially of the tank with its lower edge protruding downward beneath the surface of the glass.

9. The combination of a tank rotatable about a vertical axis, means to supply molten glass to the tank, a stationary refractory arm extending radially of the tank with its lower edge protruding downward beneath the surface of the glass, said arm being arranged to force beneath the surface of the glass, portions which have become chilled, and means for adjusting said arm vertically.

10. The combination of a tank rotatable about a vertical axis, means to supply molten glass to the tank, a stationary refractory arm extending radially of the tank with its lower edge protruding downward beneath the surface of the glass, and means for adjusting said arm horizontally.

11. The combination of a tank rotatable about a vertical axis, means to supply molten glass to the tank, a stationary refractory arm extending radially of the tank with its lower edge protruding downward beneath the surface of the glass, and mechanism for rotatively adjusting said arm horizontally about the axis of rotation of the tank.

12. The combination of a circular tank rotatable continuously about its central vertical axis, means for supplying molten glass to the tank, a central vertical shaft mounted over the tank centrally thereof, a radially disposed stationary arm carried by said shaft and dipping into the glass in the tank, means for rotatively adjusting said arm, and means for vertically adjusting the arm.

13. The combination of a circular tank rotatable about its central vertical axis, means for supplying molten glass to the tank, a central vertical shaft mounted over the tank centrally thereof, and a radially disposed arm carried by said shaft and dipping into the glass in the tank, said arm being curved in a horizontal plane to provide a pocket into which the glass is carried by the rotation of the tank to thereby assist in causing the surface portion of the moving glass to pass beneath said arm.

14. The combination of a tank, means to supply molten glass thereto, means for rotating the tank and thereby causing a movement of the glass past a gathering area, a series of molds brought in succession to the gathering area for gathering mold charges by suction, and means by which surface portions of the glass, chilled during the gathering operations, are forced beneath the surface before they are again brought to the gathering area.

15. The combination of a tank, means to supply molten glass thereto, means for rotating the tank and thereby causing a movement of the glass past a gathering area, a series of molds brought in succession to the gathering area for gathering mold charges by suction, and a stationary obstructing element located over the glass and projecting downward beneath the surface of the glass in position to cause surface portions of the glass chilled at the gathering area to move downward beneath the surface before being again brought to the gathering area.

Signed at Toledo, in the county of Lucas and State of Ohio, this 14th day of March, 1927.

LEONARD D. SOUBIER.